United States Patent
Sato

(10) Patent No.: US 7,482,069 B2
(45) Date of Patent: *Jan. 27, 2009

(54) POLYCRYSTALLINE STRUCTURE FILM HAVING INCLINED LATTICE SURFACES

(75) Inventor: Kenji Sato, Higashine (JP)

(73) Assignee: Fujitsu Limited, Kawasaki (JP)

( * ) Notice: Subject to any disclaimer, the term of this patent is extended or adjusted under 35 U.S.C. 154(b) by 454 days.

This patent is subject to a terminal disclaimer.

(21) Appl. No.: 11/079,203

(22) Filed: Mar. 14, 2005

(65) Prior Publication Data

US 2005/0158587 A1    Jul. 21, 2005

Related U.S. Application Data

(63) Continuation of application No. PCT/JP03/11424, filed on Sep. 8, 2003.

(30) Foreign Application Priority Data

Feb. 12, 2002  (JP) .............. 2002-350192

(51) Int. Cl.
G11B 5/66    (2006.01)

(52) U.S. Cl. .................. 428/831.2

(58) Field of Classification Search .............. 428/831.2, 428/832
See application file for complete search history.

(56) References Cited

U.S. PATENT DOCUMENTS

| | | | |
|---|---|---|---|
| 4,776,938 A | 10/1988 | Abe et al. | |
| 4,808,489 A | 2/1989 | Abe et al. | |
| 5,851,660 A * | 12/1998 | Tohma et al. | 428/336 |
| 5,875,082 A | 2/1999 | Takayama et al. | |
| 6,349,008 B1 | 2/2002 | Takayama et al. | |
| 6,761,982 B2 * | 7/2004 | Sakawaki et al. | 428/831.2 |
| 6,808,830 B2 * | 10/2004 | Sakawaki et al. | 428/831.2 |
| 6,855,416 B2 * | 2/2005 | Sugiyama et al. | 428/336 |
| 7,083,872 B2 * | 8/2006 | Sato | 428/831.2 |
| 7,115,191 B2 * | 10/2006 | Shibamoto et al. | 204/192.15 |
| 2002/0048695 A1 | 4/2002 | Sakawaki et al. | |
| 2002/0127436 A1 | 9/2002 | Shibamoto et al. | |
| 2002/0160234 A1 | 10/2002 | Sakawaki et al. | |
| 2003/0175556 A1 | 9/2003 | Sakawaki et al. | |

FOREIGN PATENT DOCUMENTS

| | | |
|---|---|---|
| JP | 58-128023 | 7/1983 |
| JP | 62-082516 | 4/1987 |
| JP | 62-082517 | 4/1987 |

(Continued)

*Primary Examiner*—Holly Rickman
(74) *Attorney, Agent, or Firm*—Greer, Burns & Crain, Ltd.

(57) ABSTRACT

A polycrystalline structure film has a seed layer extending over the surface of an object. The seed layer includes crystal grains growing in the orthogonal direction perpendicular to the surface of the object. A crystalline layer extends on the surface of the seed layer. The crystal grains have normals perpendicular to lattice surfaces preferentially oriented in a predetermined direction. The normals are inclined relative to the orthogonal direction. The polycrystalline structure film allows the growth of the crystal grains in the orthogonal direction perpendicular in the seed layer. The lattice surfaces are inclined relative to the orthogonal direction in the crystal grains in the seed layer. The characteristic of the crystalline layer can be controlled under the influence of the crystal grains in the seed layer.

12 Claims, 7 Drawing Sheets

FOREIGN PATENT DOCUMENTS

| | | |
|---|---|---|
| JP | 2-068716 | 3/1990 |
| JP | 5-101385 | 4/1993 |
| JP | 5-143988 | 6/1993 |
| JP | 8-007250 | 1/1996 |
| JP | 9-212855 | 8/1997 |
| JP | 2002-203312 | 7/2002 |
| JP | 2002-260207 | 9/2002 |
| JP | 2002-260208 | 9/2002 |
| JP | 2002-260210 | 9/2002 |
| JP | 2002-260218 | 9/2002 |
| JP | WO2004/051630 * | 6/2004 |

* cited by examiner

POLYCRYSTALLINE STRUCTURE FILM HAVING INCLINED LATTICE SURFACES

This is a continuation of International Application No. PCT/JP2003/011424, filed Sep. 8, 2003.

BACKGROUND OF THE INVENTION

1. Field of the Invention

The present invention relates to a polycrystalline structure film often utilized in a magnetic recording medium such as a hard disk (HD), for example.

2. Description of the Prior Art

Texture is well known in the technical field of hard disks. The texture is normally established over the surface of an aluminum substrate, for example. Abasement layer and a magnetic layer for recordation made of a crystalline layer are layered on the surface of the substrate. The texture serves to establish the magnetic anisotropy in the circumferential direction of the substrate in the magnetic layer for recordation. The magnetic characteristic is thus improved in the hard disk.

A glass substrate is recently utilized in the hard disk in place of the aluminum substrate. Texture is hardly formed over the surface of the hard glass substrate. The magnetic anisotropy should be established in the magnetic layer on the glass substrate without the texture. Japanese Patent Application Publication No. 2002-203312 proposes a technique to form an inclined growth crystalline layer. Individual crystal grains grow in a direction inclined from the orthogonal direction perpendicular to the surface of the substrate in the inclined growth crystalline layer, for example. A crystalline layer is formed on the inclined growth crystalline layer. The inclined growth crystalline layer serves to improve the magnetic anisotropy in the circumferential direction in the crystalline layer.

SUMMARY OF THE INVENTION

It is accordingly an object of the present invention to provide a polycrystalline structure film capable of controlling the characteristic of a crystalline layer in a way different from a conventional way. It is an object of the present invention to provide a magnetic recording medium contributing to improvement of magnetic anisotropy in a magnetic layer for recordation in a way different from a conventional way.

According to the present invention, there is provided a polycrystalline structure film comprising: a seed layer extending over the surface of an object, said seed layer including crystal grains growing in the orthogonal direction perpendicular to the surface of the object; and a crystalline layer extending on the surface of the seed layer, wherein said crystal grains have normals perpendicular to lattice surfaces preferentially oriented in a predetermined direction, said normals being inclined relative to the orthogonal direction.

The polycrystalline structure film allows the growth of the crystal grains in the orthogonal direction perpendicular to the surface of the object in the seed layer. The normal perpendicular to the lattice surface is inclined relative to the orthogonal direction in the crystal grains in the seed layer. The characteristic of the crystalline layer can be controlled under the influence of the crystal grains in the seed layer.

When the lattice surface is preferentially oriented in a predetermined direction in the crystal grain of the seed layer, the normal perpendicular to the lattice surface is inclined from the orthogonal direction. The inclined lattice surfaces serve to define grooves on the surface of the seed layer between the adjacent crystal grains. When the crystalline layer is formed on the surface of the seed layer, the crystalline layer is allowed to enjoy an enhanced anisotropy even if texture is not formed over the surface of the object. Here, the crystal grains may be made of an alloy containing Cr and Nb in the polycrystalline structure film, for example. The seed layer of the polycrystalline structure film may be formed through deposition of an inclined incidence. The formation of the seed layer may be conducted in an atmosphere containing nitrogen.

The aforementioned polycrystalline structure film may be utilized in a magnetic recording medium incorporated within a magnetic storage device, for example. The magnetic recording medium may include: a substrate; a seed layer extending over the surface of the substrate, said seed layer including crystal grains growing in the orthogonal direction perpendicular to the surface of the substrate; and a crystalline layer extending on the surface of the seed layer, said crystalline layer including a magnetic layer. Here, the crystal grains have normals perpendicular to lattice surfaces preferentially oriented in a predetermined direction. The normals are inclined relative to the orthogonal direction.

The substrate may be formed in a disk shape in the magnetic recording medium, for example. In this case, the normals may be inclined within corresponding orthogonal planes each extending in the orthogonal direction and including a radius line of the substrate. Additionally, the lattice surfaces may be inclined to descend in the outward direction along the radial direction of the substrate.

The magnetic recording medium allows the growth of the crystal grains in the orthogonal direction perpendicular to the surface of the substrate in the seed layer. The normal perpendicular to the lattice surface is inclined outward from the orthogonal direction in the crystal grains in the seed layer. In particular, the normal is inclined within the plane extending in the orthogonal direction and including the radius line. The lattice surface is thus inclined in the individual crystal grain. The inclined lattice surfaces serve to define grooves on the surface of the seed layer between the crystal grains adjacent each other in the radial direction of the substrate. When the crystalline layer is formed on the surface of the seed layer, the axes of easy magnetization are reliably aligned in the circumferential direction of the substrate. The crystalline layer is thus allowed to enjoy an enhanced magnetic characteristic in the circumferential direction even if texture is not formed over the surface of the substrate. The magnetic recording medium is thus allowed to enjoy an enhanced anisotropy in the circumferential direction.

On the contrary, texture may be formed on the surface of the substrate in the magnetic recording medium. The texture may include scratches extending in the circumferential direction of the disk-shaped substrate. The scratches serve to improve the magnetic characteristic in the circumferential direction of the magnetic recording medium.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
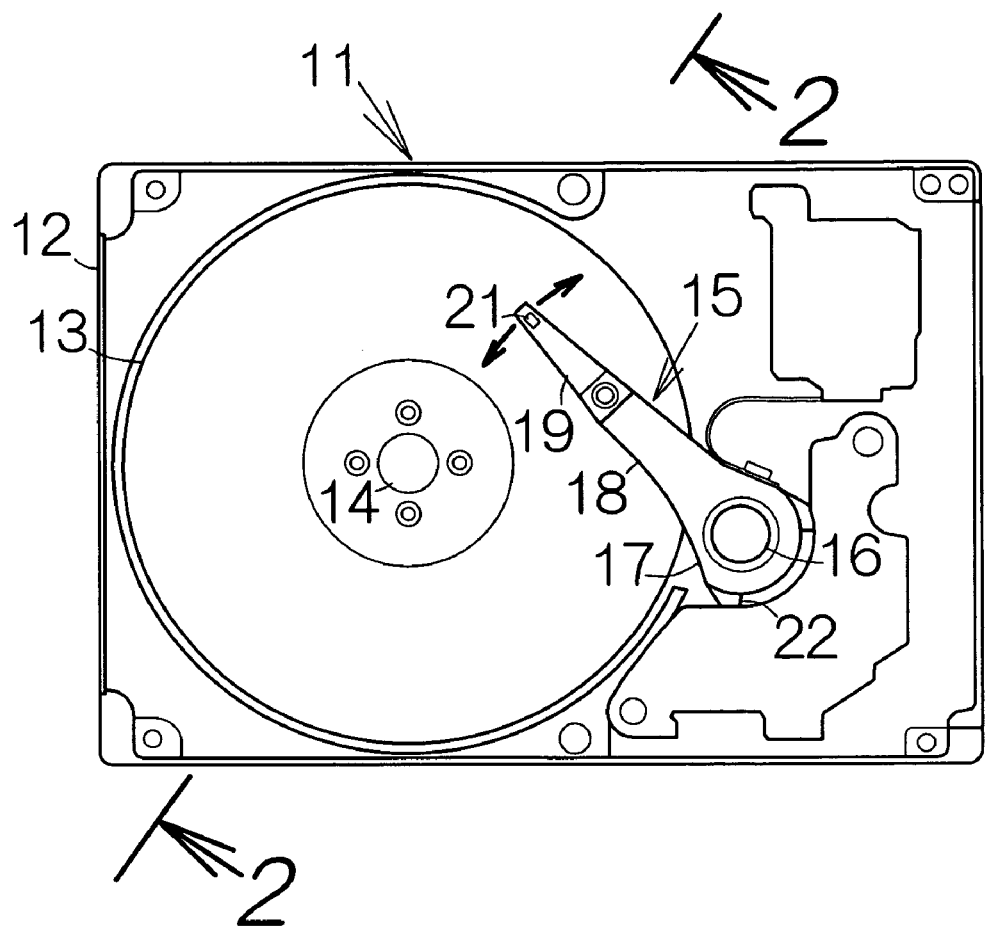
FIG. 1 is a plan view schematically illustrating the structure of a hard disk drive as an example of a magnetic recording medium drive.

FIG. 1 schematically illustrates the interior structure of a hard disk drive (HDD) 11 as an example of a magnetic recording medium drive or storage device. The HDD 11 includes a box-shaped main enclosure 12 defining an inner space of a flat parallelepiped, for example. At least one magnetic recording disk 13 is incorporated in the inner space within the main enclosure 12. The magnetic recording disk 13 is mounted on the driving shaft of a spindle motor 14. The spindle motor 14 is allowed to drive the magnetic recording disk 13 for rotation at a higher revolution rate such as 7,200 rpm, 10,000 rpm, or the like, for example. A cover, not shown, is coupled to the main enclosure 12 so as to define the closed inner space between the main enclosure 12 and itself.

A head actuator 15 is also incorporated in the inner space of the main enclosure 12. The head actuator 15 includes an actuator block 17 coupled to a vertical support shaft 16 for relative rotation. Rigid actuator arms 18 are defined in the actuator block 17. The actuator arm 18 is designed to extend in the horizontal direction from the vertical support shaft 16. The actuator arms 18 are related to the front and back surfaces of the magnetic recording disk or disks 13. The actuator block 17 may be made of aluminum, for example. In this case, molding process may be employed to form the actuator block 17.

An elastic head suspension 19 is fixed to the tip or front end of the actuator arm 18. The head suspension 19 is designed to extend forward from the front end of the actuator arm 18. As conventionally known, a flying head slider 21 is supported at the front end of the head suspension 19. In this manner, the flying head slider 21 is coupled to the actuator block 17. The flying head slider 21 is thus opposed to the surface of the magnetic recording disk 13.

The head suspension 19 serves to urge the flying head slider 21 toward the surface of the magnetic recording disk 13. When the magnetic recording disk 13 rotates, the flying head slider 21 is allowed to receive airflow generated along the rotating magnetic recording disk 13. The airflow serves to generate a lift on the flying head slider 21. The flying head slider 21 is thus allowed to keep flying above the surface of the magnetic recording disk 13 during the rotation of the magnetic recording disk 13 at a higher stability established by the balance between the lift and the urging force of the head suspension 19.

A read/write electromagnetic transducer, not shown, is mounted on the flying head slider 21. The read/write electromagnetic transducer comprises a read element and a write element. The read element may include a giant magnetoresistive (GMR) element or a tunnel-junction magnetoresistive (TMR) element designed to detect a magnetic bit data from the magnetic recording disk 13 by utilizing variation of the electric resistance in a spin valve film or tunnel-junction film, for example. The write element may include a thin film magnetic head designed to write a magnetic bit data onto the magnetic recording disk 13 by utilizing a magnetic field induced in a conductive swirly coil pattern, for example.

A power source 22 such as a voice coil motor (VCM) is connected to the tail of the actuator block 17. The power source 22 drives the actuator block 17 for rotation around the support shaft 16. The rotation of the actuator block 17 induces the swinging movement of the actuator arms 18 and the head suspensions 19. When the actuator arm 18 is driven to swing about the support shaft 16 during the flight of the flying head slider 21, the flying head slider 21 is allowed to cross the recording tracks defined on the magnetic recording disk 13 in the radial direction of the magnetic recording disk 13. This radial movement serves to position the flying head slider 21 right above a target recording track on the magnetic recording disk 13. As conventionally known, in the case where two or more magnetic recording disks 13 are incorporated within the inner space of the main enclosure 12, a pair of the elastic head suspension 19 and a pair of the actuator arm 18 are disposed between the adjacent magnetic recording disks 13.

Figure 2:
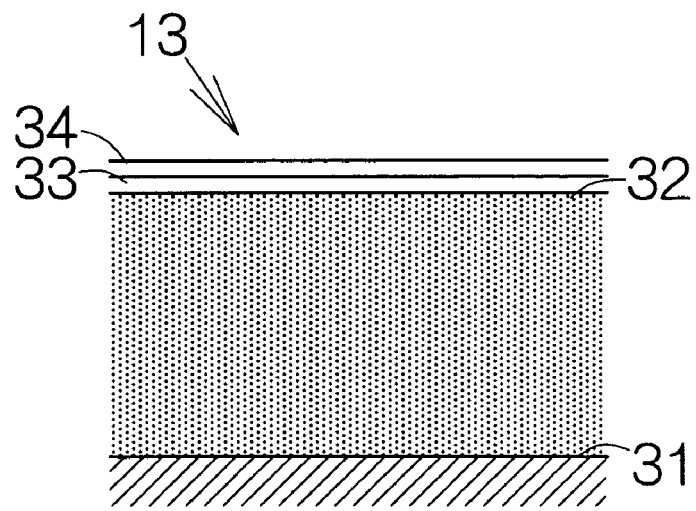
FIG. 2 is an enlarged vertical sectional view, taken along the line 2-2 in FIG. 1, for illustrating the structure of a magnetic recording disk.

FIG. 2 illustrates in detail the structure of the magnetic recording disk 13. The magnetic recording disk 13 includes a substrate 31, and polycrystalline structure films 32 extending over the front and back surfaces of the substrate 31, respectively. The substrate 31 may be made of glass, for example. Alternatively, the substrate 31 may be made of silicon, sapphire, aluminum, or the like. The front and back surfaces of the substrate 31 should be made flat. Magnetic information data is recorded in the polycrystalline structure films 32. The polycrystalline structure film 32 is covered with a protection overcoat 33 and a lubricating agent film 34. The protection overcoat 33 may be a diamond-like-carbon (DLC) film. The lubricating agent film 34 may be a perfluoropolyether (PFPE) coating.

Figure 3:
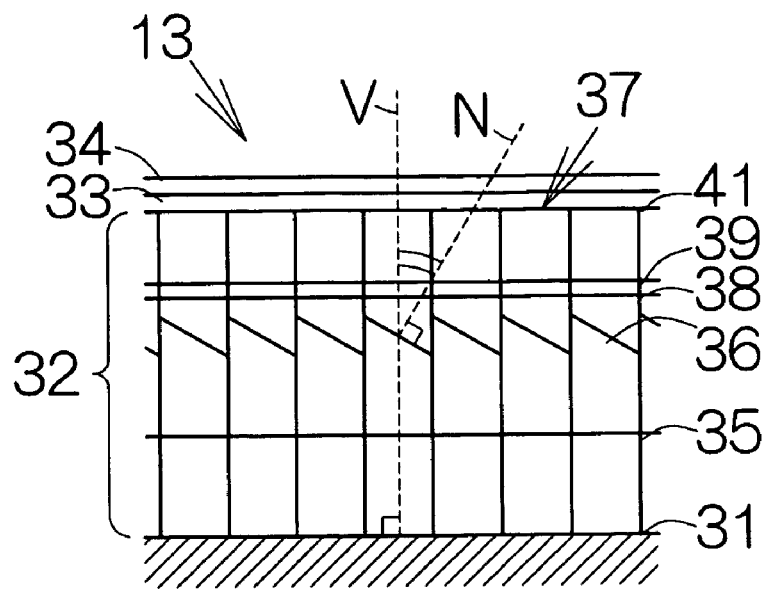
FIG. 3 is an enlarged vertical sectional view of the magnetic recording disk for illustrating the structure of the magnetic recording disk in detail.

As shown in FIG. 3, the polycrystalline structure film 32 includes first and second seed layers 35, 36. The first seed layer 35 extends on the upper surface of the substrate 31. The second seed layer 36 extends on the upper surface of the first seed layer 35. A layered crystalline layer 37 extends on the upper surface of the second seed layer 36. The first seed layer 35 may be an amorphous layer, for example. The amorphous layer may be made of an alloy containing Cr and Ti, for example. Here, a CrTi film having the thickness of 25 nm approximately is utilized as the first seed layer 35, for example.

The second seed layer 36 may be made of an alloy containing Cr and Nb, for example. Here, a CrNb film having the thickness of 25 nm approximately is utilized as the second seed layer 36, for example. The second seed layer 36 includes crystal grains growing in the orthogonal direction V perpendicular to the surface of the substrate 31, as shown in FIG. 3. Here, the lattice surfaces of the crystal grains are preferentially oriented in a predetermined direction. The crystal grain allows the lattice surface to get descended outward, so that a normal N perpendicular to the lattice surface gets inclined from the orthogonal direction V by a predetermined inclination angle.

The layered crystalline layer 37 includes abasement layer 38 extending on the upper surface of the second seed layer 36. Crystal grains of a body-centered cubic (bcc) structure are established in the basement layer 38. The basement layer 38 may be made of Cr or an alloy containing Cr, for example. Here, a CrMo film having the thickness of 4 nm approximately is utilized as the basement layer 38.

An intermediate layer 39 extends on the upper surface of the basement layer 38. Crystal grains of a hexagonal close-packed (hcp) structure are established in the intermediate layer 39. The intermediate layer 39 may be made of an alloy containing Co, for example. Here, a CoCrTa film having the thickness of 1 nm approximately is utilized as the intermediate layer 39.

A recording magnetic layer 41 extends on the upper surface of the intermediate layer 39. Magnetic information data are recorded in the recording magnetic layer 41. Crystal grains of a body-centered cubic (bcc) structure are established in the recording magnetic layer 41. The recording magnetic layer 41 may be made of an alloy containing Co, for example. Here, a CoCrPtBCu film having the thickness of 15 nm approximately is utilized as the recording magnetic layer 41. Alternatively, a layered magnetic film may be utilized at the recording magnetic layer 41. In this case, a Ru layer having the thickness of 0.7 nm approximately may be interposed between the adjacent ones of the individual magnetic layers.

The polycrystalline structure film 32 allows the alignment of the axis of easy magnetization along the circumferential direction of the substrate 31 in the recording magnetic layer 41 based on the influence of the second seed layer 36, even if a texture is not formed over the surface of the substrate 31. The magnetic recording disk 13 is allowed to enjoy an enhanced Hcc/Hcr. Here, Hcc is the coercivity in the circumferential direction of the magnetic recording disk 13. Hcr is the coercivity in the radial direction of the magnetic recording disk 13.

Next, a brief description will be made on a method of making the magnetic recording disk 13. A substrate 31 of disk-shape is prepared. The surfaces of the substrate 31 are smoothed. The substrate 31 is then set in a magnetron sputtering apparatus, for example, after the substrate 31 has been heated to 220 degrees Celsius. A carbon heater may be employed to heat the substrate 31. The magnetron sputtering apparatus is employed to form the polycrystalline structure film 32 on the surfaces of the substrate 31. The process will be described below in detail. The protection overcoat 33 is thereafter formed on the surface of the polycrystalline structure film 32. Chemical vapor deposition (CVD) may be employed to form the protection overcoat 33. The lubricating agent film 34 is then formed on the surface of the protection layer 33. The substrate 31 may be dipped into a solution containing perfluoropolyether.

Figure 4:
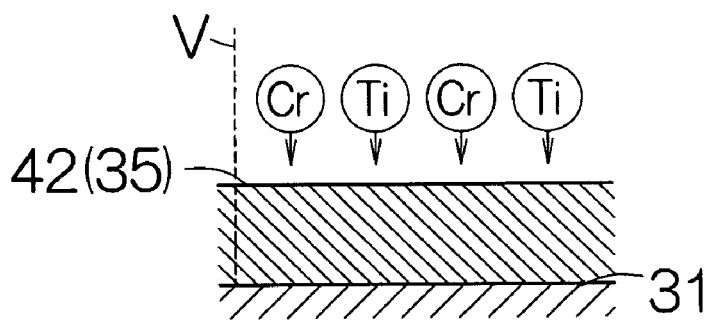
FIG. 4 is a vertical partial sectional view of a substrate for schematically illustrating the process of forming a first seed layer.

As shown in FIG. 4, a CrTi film 42 as the first seed layer 35 in the polycrystalline structure film 32 is first formed on the surface of the substrate 31. Sputtering is employed to form the first seed layer 35 through deposition of the orthogonal incidence. A CrTi target is set in the sputtering apparatus. When Cr and Ti atoms burst out of the CrTi target, the Cr and Ti atoms are allowed to fall in the orthogonal direction V perpendicular to the surface of the substrate 31. Specifically, the incidence is in this case set at zero degree. The amorphous CrTi film 42 is thus formed on the surface of the substrate 31. The CrTi film 42 contains Cr at 50 at % and Ti at 50 at %.

Figure 5:
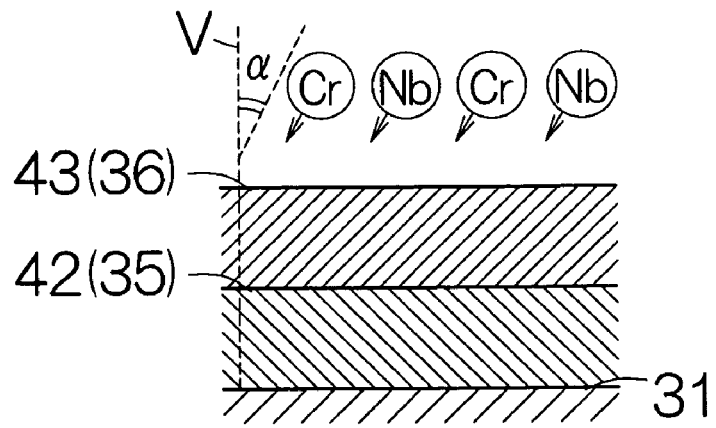
FIG. 5 is a vertical partial sectional view of a substrate for schematically illustrating the process of forming a second seed layer.

As shown in FIG. 5, a CrNb film 43 as the second seed layer 36 is subsequently formed on the surface of the CrTi film 42. Sputtering is employed to form the CrNb film 43 through deposition of an inclined incidence. A CrNb target is set in the sputtering apparatus. Ar gas is injected into the chamber of the sputtering apparatus. $N_2$ gas is mixed with the Ar gas. Namely, the CrTi film 42 is formed in an atmosphere containing nitrogen. $N_2$ gas may be mixed at the ratio of partial pressure in a range from 10% to 60%, for example. Here, the ratio of the partial pressure is set at 20%. The pressure of the gas is set at 1.6 Pa approximately within the chamber.

When Cr and Nb atoms burst out of the CrNb target, the Cr and Nb atoms are allowed to fall in a predetermined incidence α inclined from the orthogonal direction V. The Cr and Nb atoms may be directed toward the center of the substrate 31 from the outer periphery of the substrate 31. The CrNb film 43 is thus formed on the surface of the CrTi film 42. The CrNb film 43 contains Cr at 67 at % and Nb at 33 at %.

Figure 6:
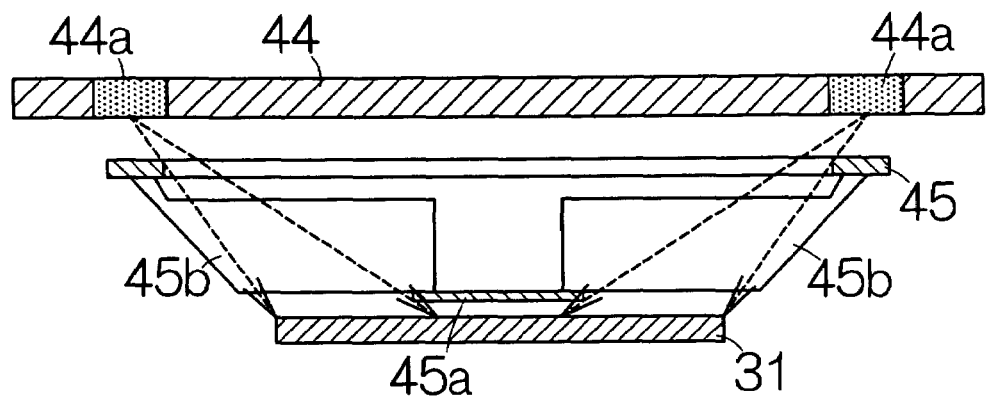
FIG. 6 is a vertical sectional view of a target and a substrate for schematically illustrating the process of forming the second seed layer.

The CrNb target 44 is shaped in a disk, for example. The diameter of the CrNb target 44 is set larger than that of the substrate, as shown in FIG. 6. An annular erosion position 44a is set outside the outer periphery of the substrate 31 in the CrNb target 44. The Cr and Nb atoms burst out of the CrNb target 44 from the erosion position 44a in response to supply of electric current. The atoms fly from the position outside the outer periphery of the substrate 31 toward the center of the substrate 31.

Figure 7:
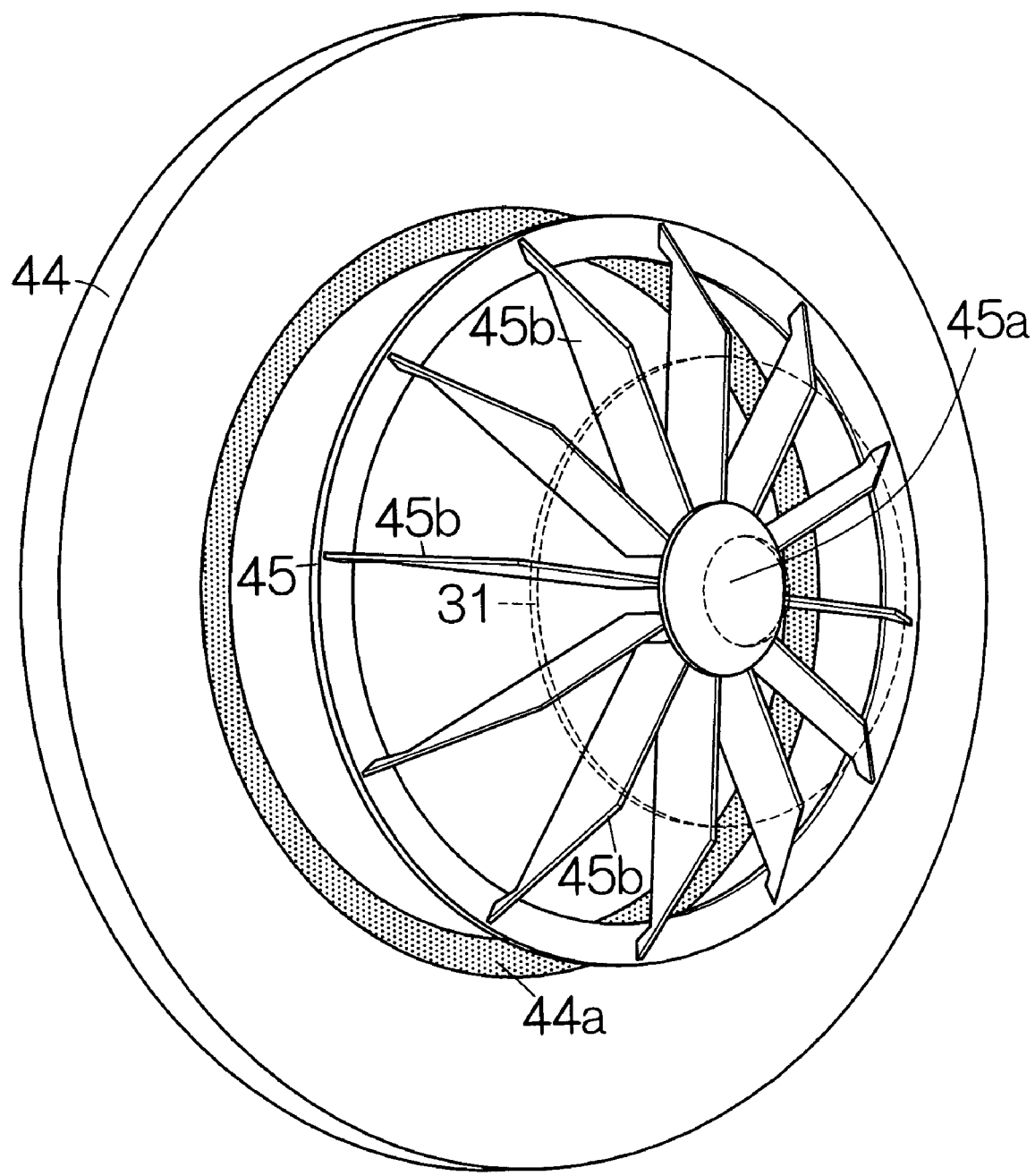
FIG. 7 is a perspective view of the target and a shielding member for schematically illustrating the process of forming the second seed layer.

A shielding member 45 is located in a space between the CrNb target 44 and the substrate 31. As shown in FIG. 7, the shielding member 45 includes a disk-shaped member 45a at the center of the shielding member 45. Shielding plates 45b are formed to extend in the radial directions from the disk-shaped member 45a in the shielding member 45. The disk-shaped member 45a is positioned at a position opposed right to the center of the substrate 31. When the shielding member 45 is aligned with the substrate 31, the shielding plates 45b are set to extend in the orthogonal direction perpendicular to the surface of the substrate 31. The shielding plates 45b serve to restrain the incidence of the atoms in a predetermined direction. Specifically, the shielding plates 45b shield the atoms falling along the circumferential direction. An approach of a sufficient space is still maintained for the atoms between the CrNb target 44 and the substrate 31, so that the Cr and Nb atoms still efficiently deposit on the surface of the substrate 31. The formation of the CrNb film 43 can still be completed within a shorter time period. In this case, the crystal grains grow in the orthogonal direction V on the substrate 31 irrespective of the predetermined incidence α of the Cr and Nb atoms. Moreover, the normal N perpendicular to the lattice surface preferentially oriented in a predetermined direction is inclined relative to the orthogonal direction V by a predetermined inclination angle α in the individual crystal grain. The rotation of the substrate 31 serves to realize a uniform deposition of the Cr and Nb atoms all over the upper surface of the substrate 31.

On the contrary, a conventional method utilizes a shielding member covering over the substrate when the CrNb film 43 is to be formed. An annular slit is formed in the conventional shielding member. Atoms must penetrate through the slit so as to reach the substrate. The approach for atoms is remarkably narrowed. A large amount of the Cr and Nb atoms deposit on the shielding member. It takes a longer time period to form the CrNb film 43. This conventional method allows the growth of the crystal grains in a direction inclined from the orthogonal direction V.

If $N_2$ gas is not mixed in Ar gas in the chamber during the deposition of the Cr and Nb atoms, an amorphous CrNb is obtained. No crystal grains are established in the CrNb film. Grooves are established on the surface of the CrNb film, as described later in detail. The CrNb film of this type cannot improve the magnetic anisotropy of the recording magnetic layer.

Figure 8:
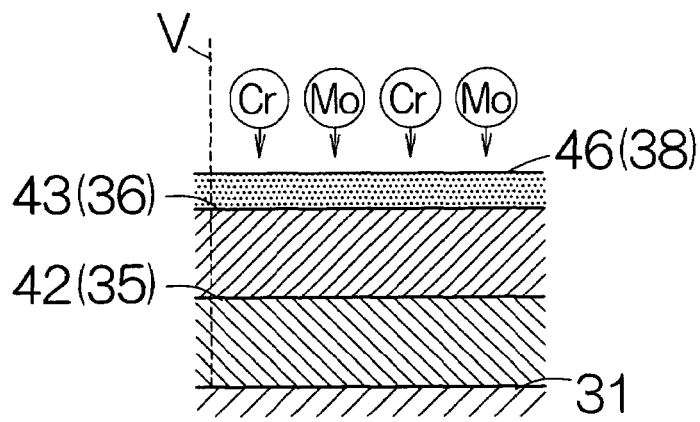
FIG. 8 is a vertical partial sectional view of the substrate for schematically illustrating the process of forming a basement layer.

The surface of the CrNb film 43 is then subjected to oxidation. The CrNb film 43 may be exposed to the atmosphere for oxidation. Alternatively, gas containing oxygen may be injected into the chamber. A CrMo film 46 as the basement layer 38 is thereafter formed on the upper surface of the CrNb film 43, as shown in FIG. 8. Sputtering is for example employed to form the CrMo film 46 through deposition of the orthogonal incidence. A CrMo target is set in the sputtering apparatus. The Cr and Mo atoms are allowed to fall in the orthogonal direction V from the CrMo target. Specifically, the incidence is in this case set at zero degree. The CrMo film 46 is thus formed on the upper surface of the CrNb film 43. The CrMo film 46 contains Cr at 75 at % and Mo at 25 at %. Crystal grains of the body-centered cubic (bcc) structure are established in the CrMo film 46, namely in the basement layer 38.

Figure 9:
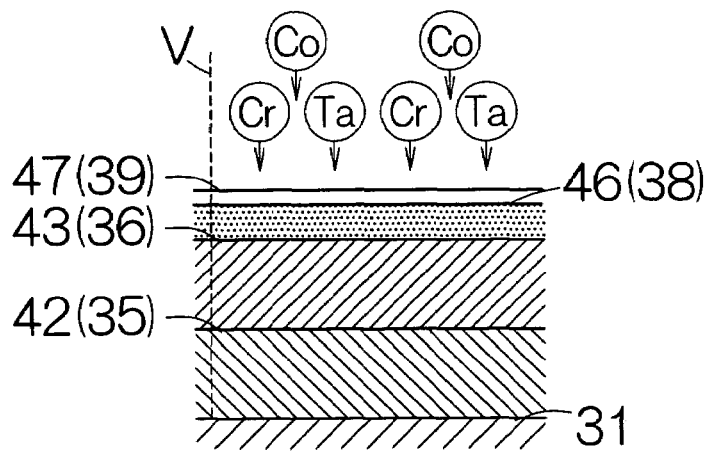
FIG. 9 is a vertical partial sectional view of the substrate for schematically illustrating the process of forming an intermediate layer.

A CoCrTa film 47 as the intermediate layer 39 is thereafter formed on the upper surface of the CrMo film 46, as shown in FIG. 9. Sputtering is for example employed to form the CoCrTa film 47 through deposition of the orthogonal incidence. A CoCrTa target is set in the sputtering apparatus. The Co, Cr and Ta atoms are allowed to fall in the orthogonal direction V from the CoCrTa target. Specifically, the incidence is in this case set at zero degree. The CoCrTa film 47 is thus formed on the upper surface of the CrMo film 46. The CoCrTa film 47 contains Co at 82 at %, Cr at 13 at % and Ta at 5 at %. Crystal grains of the hexagonal close-packed (hcp) structure are established in the CoCrTa film 47, namely in the intermediate layer 39.

Figure 10:
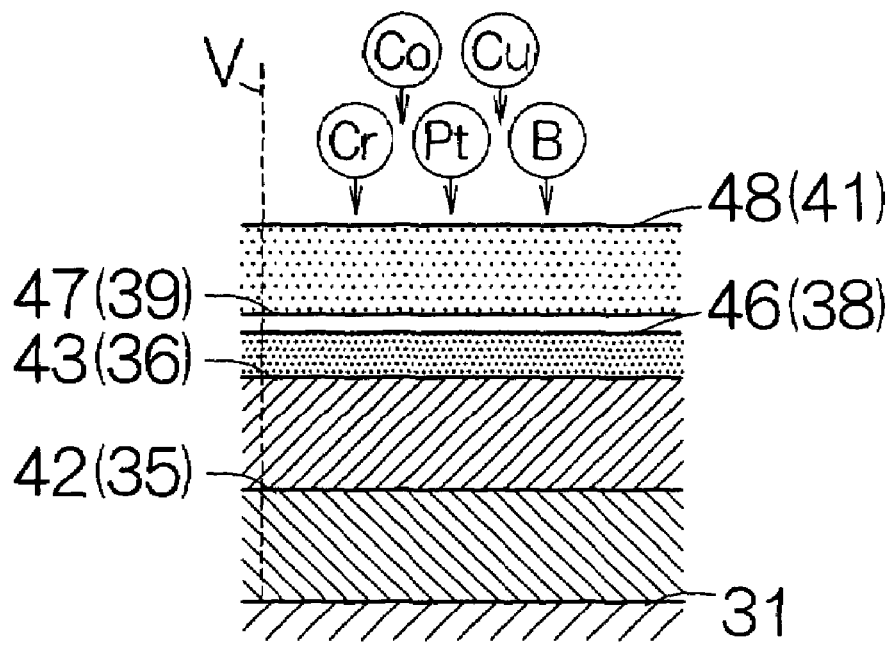
FIG. 10 is a vertical partial sectional view of the substrate for schematically illustrating the process of forming a recording magnetic layer.

A CoCrPtBCu film 48 as the recording magnetic layer 41 is thereafter formed on the upper surface of the CoCrPtBCu film 47, as shown in FIG. 10. Sputtering is for example employed to form the CoCrTa film 47 through deposition of the orthogonal incidence. A CoCrPtBCu target is set in the sputtering apparatus. The Co, Cr, Pt, B and Cu atoms are allowed to fall in the orthogonal direction V from the CoCrPtBCu target. Specifically, the incidence is in this case set at zero degree. The CoCrPtBCu film 48 is thus formed on the upper surface of the CoCrTa film 47. The CoCrPtBCu film 48 contains Co at 58 at %, Cr at 19 at %, Pt at 12 at %, B at 7 at % and Cu at 4 at %. Crystal grains of the hexagonal close-packed (hcp) structure are established in the CoCrPtBCu film 48, namely in the recording magnetic layer 41.

The aforementioned method allows the growth of the crystal grains in the orthogonal direction V perpendicular to the surface of the substrate 31 in the CrNb film 43. The normal N perpendicular to the lattice surface preferentially oriented in a predetermined direction is inclined outward from the orthogonal direction V within an orthogonal plane that extends in the orthogonal direction perpendicular to the surface of the substrate 31 and includes a radius line of the substrate 31. A groove can thus be defined on the surface of the CrNb film 43 between the crystal grains adjacent each other in the radial direction of the substrate 31. When the CrMo film 46, the CoCrTa film 47 and the CoCrPtBCu film 48 are formed on the surface of the CrNb film 43 based on epitaxy, the axes of easy magnetization are reliably aligned in the circumferential direction of the substrate 31 in the CoCrPtBCu film 48, namely in the recording magnetic layer 41. Even if texture is not formed on the surface of the substrate 31, the magnetic anisotropy is enhanced in the recording magnetic layer 41. The magnetic recording disk 13 is thus allowed to enjoy an enhanced Hcc/Hcr.

The inventor has observed the cross-section of the second seed layer 36, namely of the CrNb film 43. Transmission electron microscope (TEM) was utilized for the observation. The CrTi film 42 having the thickness of 25 nm approximately was formed on the surface of the disk-shaped substrate 31 according to the aforementioned method. The CrNb film 43 having the thickness of 100 nm approximately was formed on the surface of the CrTi film 42. The observation was effected on the CrNb film 43 at the cross-section of taken along the radial direction of the substrate 31 and at the cross-section taken along the circumferential direction of the substrate 31. The inventor has confirmed that the crystal grains grow in the orthogonal direction perpendicular to the surface of the substrate 31 in the CrNb film 43. Moreover, the inventor has confirmed that the normal perpendicular to the lattice surface is inclined from the orthogonal direction within a plane orthogonal to the surface of the substrate 31 and including a radius line of the substrate 31. The observation has revealed that the inclined lattice surface serves to form a groove on the surface of the CrNb film 43 in the circumferential direction.

Figure 11:
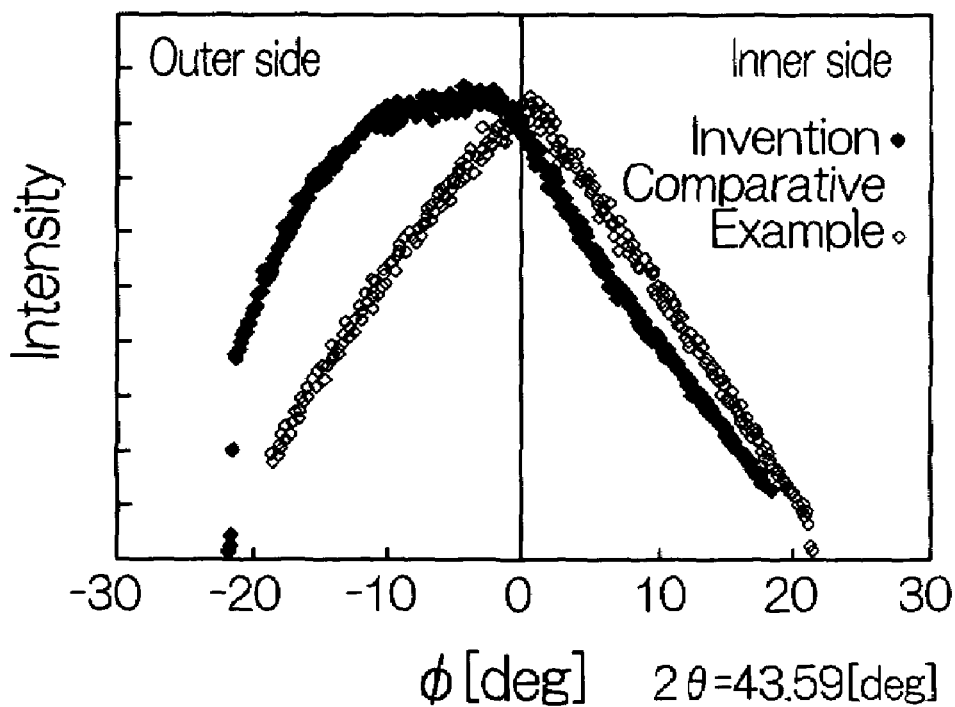
FIG. 11 is a graph illustrating the result of x-ray diffraction.

Next, the inventor has observed the second seed layer 36, namely the CrNb film 43 based on the x-ray diffraction. The inventor measured a rocking curve based on preferentially oriented lattice surfaces of the crystal grains. The distance between the surfaces was 2.077 angstroms. The CrTi film 42 having the thickness of 25 nm approximately and the CrNb film 43 having the thickness of 100 nm approximately were formed on the surface of the disk-shaped substrate 31 in the aforementioned manner. A comparative example was also prepared. The incidence α of the Cr and Nb atoms was set at zero degree so as to form the CrNb film 43 in the comparative example. The x-ray was directed from a position outside the outer periphery of the substrate 31 toward the center of the substrate 31. The inclination angle of the normal perpendicular to the lattice surface was measured relative to the orthogonal direction perpendicular to the surface of the substrate 31 in the crystal grains of the CrNb film 43. As shown in FIG. 11, a peak of the x-ray diffraction was observed in the rocking curve for the preferentially oriented lattice surfaces of the CrNb film 43 according to the embodiment of the present invention at a point shifted outward from the neutral position. This means that the normals perpendicular to the lattice surfaces are inclined outward in most of the crystal grains. The denotation "φ" defines the angle of incidence of the x-ray to the substrate 31 in, FIG. 11. A peak of the x-ray diffraction was likewise observed in the rocking curve for the preferentially oriented lattice surfaces of the CrNb film 43 according to the comparative example at the neutral position defining the inclination angle of zero degree. This mean that the normals perpendicular to the lattice surfaces are set in the orthogonal direction perpendicular to the surface of the substrate 31 in most of the crystal grains in the comparative example.

Figure 12:
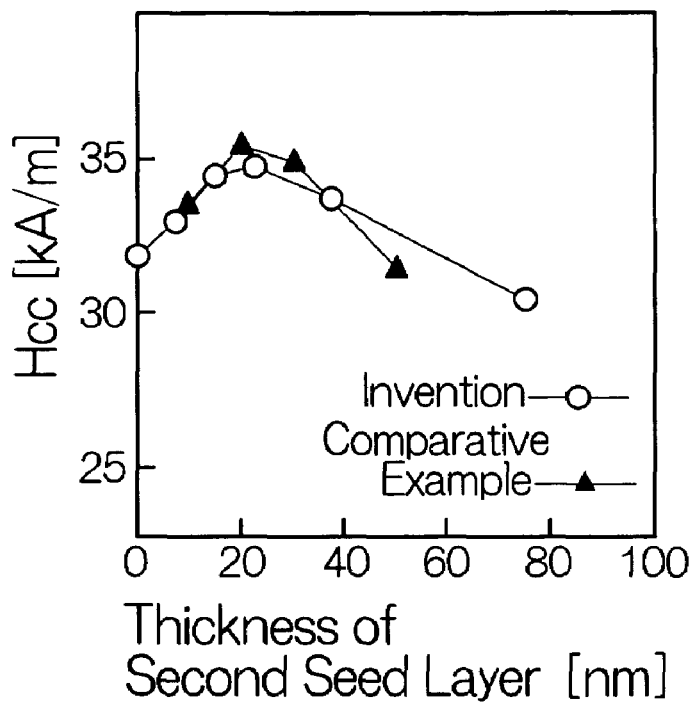
FIG. 12 is a graph illustrating the relationship between the thickness of the second seed layer and the coercivity of the recording magnetic layer.

The inventor has then observed the coercivity of the recording magnetic layer 41 in the circumferential direction. Examples were prepared in accordance with the aforementioned method. The CrNb films 43 have different thicknesses in the individual CrNb films 43. Comparative examples were also prepared. The comparative examples were prepared in accordance with the aforementioned method except that the incidence a of the Cr and Nb atoms was set at zero degree so as to form the CrNb film 43 in the comparative examples. The coercivity Hcc was measured in the circumferential direction of the magnetic recording disk 13. As shown in FIG. 12, the similar coercivity has been observed in the circumferential direction for the magnetic recording disks 13 of the embodiment and the magnetic recording disks of the comparative examples.

Figure 13:
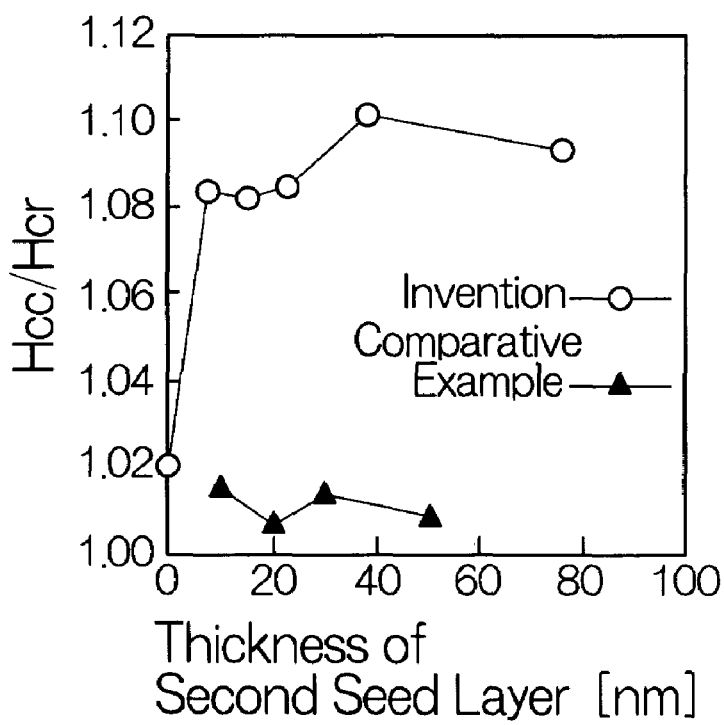
FIG. 13 is a graph illustrating the relationship between the thickness of the second seed layer and the magnetic anisotropy of the recording magnetic layer.

The inventor has then observed the magnetic anisotropy of the recording magnetic layer 41. Examples were prepared in accordance with the aforementioned method. The CrNb films 43 have different thicknesses in the individual CrNb films 43. Comparative examples were also prepared. The comparative examples were prepared in accordance with the aforementioned method except that the incidence α of the Cr and Nb atoms was set at zero degree so as to form the CrNb film 43 in the comparative examples. The coercivity Hcc was measured in the circumferential direction of the magnetic recording disk 13. The coercivity Hcr was also measured in the radial direction of the magnetic recording disk 13. As shown in FIG. 13, the magnetic recording disks 13 of the embodiment have exhibited an enhanced Hcc/Hcr as compared with the magnetic recording disks 13 according to the comparative examples over a wider range of the thickness. The magnetic anisotropy was surely confirmed in the magnetic recording disks 13 according to the embodiment.

Figure 14:
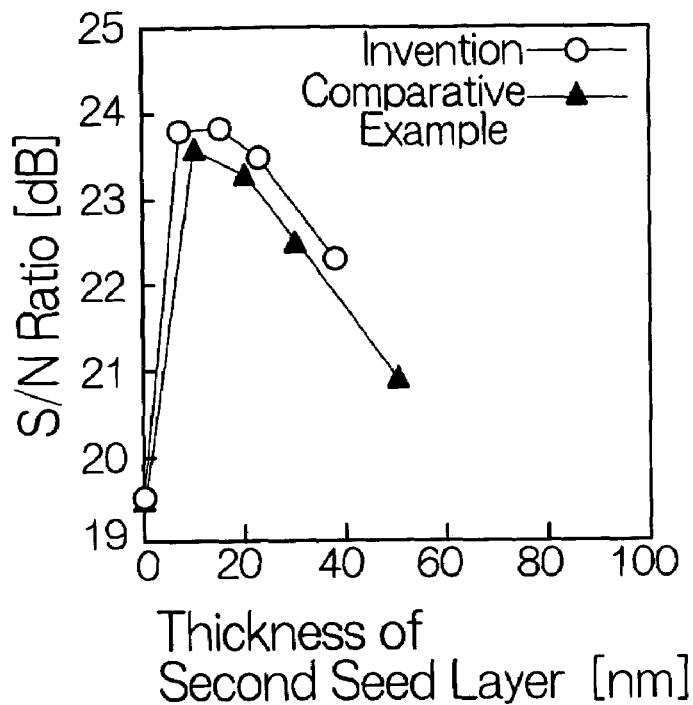
FIG. 14 is a graph illustrating the relationship between the thickness of the second seed layer and the S/N ratio of the recording magnetic layer.

Next, the inventor has measured S/N ratio of the recording magnetic layer 41. Examples and comparative examples identical to those mentioned above were prepared. Reproduction output was measured based on the linear resolution of 82.5 [kFCI]. Medium noise was also measured based on the linear resolution of 330.2 [kFCI]. As shown in FIG. 14, the magnetic recording disks 13 of the embodiment have exhibited an enhanced S/N ratio as compared with the magnetic recording disks 13 according to the comparative example over a wider range of the thickness. In particular, a higher S/N ratio can be obtained in a range between 5 nm thickness and 25 mn thickness.

Figure 15:
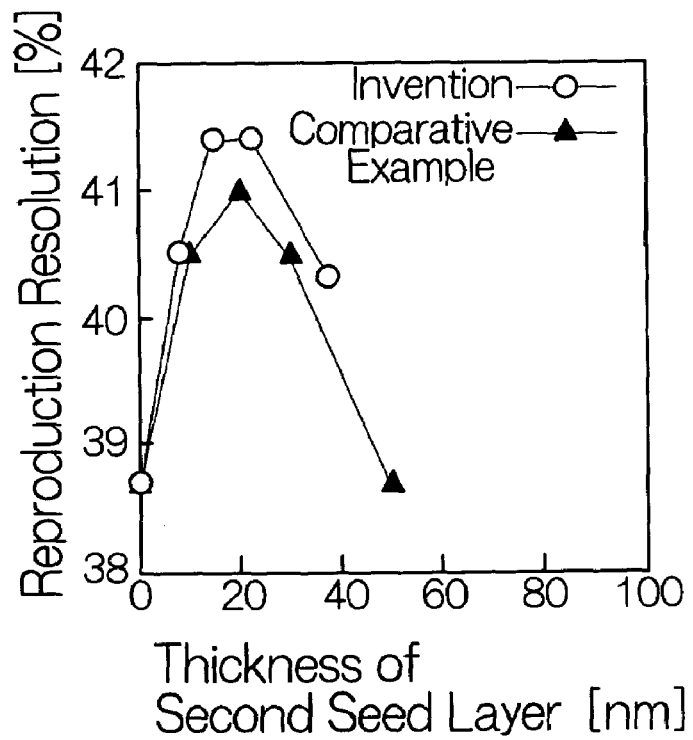
FIG. 15 is a graph illustrating the relationship between the thickness of the second seed layer and the reproduction resolution of the recording magnetic layer.

Next, the inventor has measured reproduction resolution of the recording magnetic layer 41. Examples and comparative examples identical to those mentioned above were prepared. Reproduction output was measured based on the linear resolution of 82.5 [kFCI]. Reproduction output was also measured based on the linear resolution of 330.2 [kFCI]. The reproduction resolution was calculated from the ratio of the measured reproduction outputs. As shown in FIG. 15, the magnetic recording disks 13 of the embodiment have exhibited an enhanced reproduction resolution as compared with the magnetic recording disks 13 according to the comparative example over a wider range of the thickness. In particular, a higher reproduction resolution can be obtained in a range between 5 nm thickness and 25 mn thickness.

It should be noted that texture may be established over the surfaces of the substrate 31 in the magnetic recording disk 13. The texture may comprise scratches extending in the circumferential direction. The inventor has measured Hcc/Hcr for examples and comparative examples in which texture has been established. Texture was established in the aforementioned examples and comparative examples. The magnetic recording disk 13 of the embodiment has exhibited the Hcc/Hcr of 1.11. The magnetic recording disk 13 of the comparative example exhibited the Hcc/Hcr of 1.06. The magnetic recording disk 13 of the embodiment has exhibited an enhanced Hcc/Hcr as compared with the magnetic recording disk 13 of the comparative example.

The inventor has also measured S/N ratio for the example and comparative examples in which texture has been established. Reproduction output was measured based on the linear resolution of 82.5 [kFCI]. Medium noise was also measured based on the linear resolution of 330.2 [kFCI]. The magnetic recording disk 13 of the embodiment has exhibited the S/N ratio of 24.9 [dB]. The magnetic recording disk 13 of the comparative example exhibited the S/N ratio of 24.7. The magnetic recording disk 13 of the embodiment has exhibited an enhanced S/N ratio as compared with the magnetic recording disk 13 of the comparative example.

What is claimed is:

1. A polycrystalline structure film comprising:
a seed layer extending over a surface of an object, said seed layer including crystal grains growing in an orthogonal direction perpendicular to the surface of the object; and
a crystalline layer extending on a surface of the seed layer, wherein
said crystal grains have normals perpendicular to lattice surfaces preferentially oriented in a predetermined direction, said normals being inclined relative to the orthogonal direction.

2. The polycrystalline structure film according to claim 1, wherein said seed layer is formed through deposition of an inclined incidence.

3. The polycrystalline structure film according to claim 2, wherein said crystal grains are made of an alloy containing Cr and Nb.

4. The polycrystalline structure film according to claim 3, wherein said seed layer is formed in an atmosphere containing nitrogen.

5. A magnetic recording medium comprising:
a substrate;
a seed layer extending over a surface of the substrate, said seed layer including crystal grains growing in an orthogonal direction perpendicular to the surface of the substrate; and
a crystalline layer extending on a surface of the seed layer, said crystalline layer including a magnetic layer, wherein
said crystal grains have normals perpendicular to lattice surfaces preferentially oriented in a predetermined direction, said normals being inclined relative to the orthogonal direction.

6. The magnetic recording medium according to claim 5, wherein said substrate is formed in a disk-shape, said normals being inclined within corresponding orthogonal planes each extending in the orthogonal direction and including a radius line of the substrate.

7. The magnetic recording medium according to claim 6, wherein said lattice surfaces are inclined to descend in an outward direction along a radial direction of the substrate.

8. The magnetic recording medium according to claim 7, wherein said crystal grains are made of an alloy containing Cr and Nb.

9. The magnetic recording medium according to claim 8, wherein said seed layer is formed through deposition of an inclined incidence.

10. The magnetic recording medium according to claim 9, wherein said seed layer is formed in an atmosphere containing nitrogen.

11. The magnetic recording medium according to claim 8, wherein a texture is established over the surface of the substrate.

12. The magnetic recording medium according to claim 8, wherein said magnetic recording medium is incorporated within a magnetic storage device.

* * * * *

UNITED STATES PATENT AND TRADEMARK OFFICE
CERTIFICATE OF CORRECTION

PATENT NO. : 7,482,069 B2  Page 1 of 1
APPLICATION NO. : 11/079203
DATED : January 27, 2009
INVENTOR(S) : Kenji Sato It is certified that error appears in the above-identified patent and that said Letters Patent is hereby corrected as shown below:

<u>On the title page:</u>

Item "(30) Foreign Application Priority Data," delete "February 12, 2002" and insert --December 2, 2002--.

Signed and Sealed this

Thirtieth Day of June, 2009

JOHN DOLL
*Acting Director of the United States Patent and Trademark Office*